(12) United States Patent
Knaack et al.

(10) Patent No.: US 6,205,784 B1
(45) Date of Patent: Mar. 27, 2001

(54) INTEGRALLY MOUNTED PNEUMATIC SOLENOID VALVE FOR WASTEGATE CONTROL

(75) Inventors: Russell A. Knaack, Torrance; Billy D. Watkins, Rancho Palos Verdes; Dennis Thoren, Huntington Beach; Peter Haug, Torrance, all of CA (US)

(73) Assignee: AlliedSignal Inc., MorrisTownship, NJ (US)

( * ) Notice: Subject to any disclaimer, the term of this patent is extended or adjusted under 35 U.S.C. 154(b) by 0 days.

(21) Appl. No.: 09/361,644

(22) Filed: Jul. 27, 1999

(51) Int. Cl.[7] ................................................ F02D 23/00
(52) U.S. Cl. .............................. 60/602; 60/605.2
(58) Field of Search ................................ 60/602, 605.2; 123/22

(56) References Cited

U.S. PATENT DOCUMENTS

| | | | |
|---|---|---|---|
| 4,404,804 | * 9/1983 | Tadokoro et al. | 60/602 |
| 4,485,626 | * 12/1984 | Moriguchi et al. | 60/602 |
| 4,516,401 | * 5/1985 | Jackson | 60/602 |
| 4,697,421 | * 10/1987 | Otobe et al. | 60/602 |
| 4,745,753 | * 5/1988 | Tadokoro et al. | 60/602 |
| 5,289,683 | * 3/1994 | Kurihara | 60/602 |
| 6,089,019 | * 7/2000 | Roby et al. | 60/605.2 |

FOREIGN PATENT DOCUMENTS

356020719 * 2/1981 (JP) ...................................... 123/22

* cited by examiner

*Primary Examiner*—Thomas Denion
*Assistant Examiner*—Thai-Ba Trieu
(74) *Attorney, Agent, or Firm*—Felix L. Fischer; Grant T. Langton

(57) ABSTRACT

A turbocharger for internal combustion engines having a valve mount cast or machined integral with the compressor housing and disposed along a compressor housing outside surface, the valve including a first air port in communication, through a restriction orifice, with the compressor volute and at least one of a second air port in communication with the first port, and a third port in communication with the compressor air intake. The mount includes attachments for a solenoid valve to the valve mount and a means for forming a leak-tight seal between the solenoid valve and the second and third air ports. A control system for actuating the solenoid allows venting of pressure from the second air port to the third air port for application in controlling a wastegate actuator or disengaging the wategate actuator by venting pressure from the first port to the second port.

6 Claims, 11 Drawing Sheets

INTEGRALLY MOUNTED PNEUMATIC SOLENOID VALVE FOR WASTEGATE CONTROL

FIELD OF THE INVENTION

This invention relates generally to the field of turbochargers and, more particularly, to solenoid valves and their attachment as part of a turbocharger for controlling wastegate actuation.

BACKGROUND OF THE INVENTION

Turbochargers for gasoline and diesel internal combustion engines are known devices used in the art for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The amount by which the intake air is boosted or pressurized is controlled by regulating the amount of exhaust gas that is passed through the turbine housing by diverting a portion of the exhaust through a wastegate. The wastegate is opened during turbocharger operation when the boost pressure is approaching a maximum desired pressure. The wastegate diverts an amount of exhaust gas around the turbocharger turbine to reduce the rotational speed of the turbine, thereby reducing the rotational speed of the air compressor and thus the amount by which the intake air is pressurized.

In particular turbocharger constructions known in the art, the wastegate is actuated by a spring biased pneumatic actuator directly ported to the compressor outlet of the turbocharger. As a predetermined maximum boost pressure is approached, the spring bias of the pneumatic actuator is overcome and the wastegate begins opening. Alternatively, a solenoid valve is attached to the turbocharger and a sensor, either an integrated or separate, monitors the boost pressure.

In the alternative embodiments the solenoid valve varies the pressure to the wastegate actuator which, in turn, varies the wastegate position and thus the amount of exhaust diverted around the turbine, resulting in a change in turbine and compressor rotational speed and resulting boost pressure. The solenoid valve provides the means for boost control strategies, such as eliminating premature wastegate opening and delaying the initiating point for wastegate operation.

During operation of heavy-duty trucks, maximum boost pressure is desired during engine braking operation to maximize the braking power of the engine. In such circumstances, it is desirable to override or deactivate a pneumatic wastegate actuator to maintain the wastegate in the closed position. In these embodiments, a solenoid valve located between the pressure source and the pneumatic actuator is activated to divert or dump pressure from the actuator to the atmosphere, thus disabling the wastegate. The solenoid may be operated by a simple electrical connection through a microswitch activated by the brake pedal of the truck. Through an electrical control sysem, the solenoid valve may accomplish both wastegate position control and the wastegate disabling function.

A potential problem with turbocharger constructions employing a solenoid valve for either wastegate operation or override is that the valve is mounted onto the turbocharger housing in such a manner causing it to have poor vibrational characteristics, exposing it to potential physical damage. Further, external tubing interconnections are required for the valve operation. Damage potentially encountered in such constructions could be to the valve itself or could be to external hoses or fittings that are used to connect the valve to the compressor housing for venting the pressure in the wastegate actuator. Additionally, solenoid valves used in such known turbocharger constructions are typically mounted in a direction that is not aligned with any other part of the housing in a location that is close to the compressor discharger where the temperatures are the highest, subjecting the valve to potential heat damage.

It is, therefore, desirable that a turbocharger be constructed having a solenoid valve that is attached thereto in such manner to reduce or eliminate the potential for physical damage caused to it or to exposed connecting hoses by vibration, physical contact with other engine compartment components, or heat exposure.

SUMMARY OF THE INVENTION

The present invention is embodied in a turbocharger for internal combustion engines which includes a turbine housing having a turbine rotatably disposed therein and a compressor housing having a compressor rotatably disposed therein, the compressor housing including an air intake for receiving air therein and a volute for receiving air pressurized by the compressor. A valve mount is cast or machined integral with the compressor housing and disposed along a compressor housing outside surface.

In one variation of the present invention, the valve mount includes a first air port disposed therein in communication, through a restriction orifice, with the compressor volute, a second air port disposed therein in communication with the first port, and a third port disposed therein in communication with the compressor air intake. The mount includes means for attaching a solenoid valve to the valve mount and a means for forming a leak-tight seal between the solenoid valve and the second and third air ports. A control system for actuating the solenoid allows venting of pressure from the second air port to the third air port for application in controlling a wastegate actuator.

In a second variation of the present invention, the valve mount includes a first air port disposed therein in communication with the compressor volute, and a second air port disposed therein in communication with the compressor air intake. The mount includes means for attaching a solenoid valve to the valve mount and means for forming a leak-tight seal between the solenoid valve and the first and second air ports. A control system for actuating the solenoid allows venting of pressure from the wastegate to the second air port for application in disengaging the wastegate.

DESCRIPTION OF THE DRAWINGS

The details and features of the present invention will be more clearly understood with respect to the detailed description and drawings in which.

DETAILED DESCRIPTION OF THE INVENTION

A turbocharger, constructed according to principles of this invention, comprises a compressor housing having one of a number of different solenoid valve mount embodiments that are formed as an integral member of the compressor housing for accommodating attachment with a solenoid valve for controlling or overriding a turbocharger wastegate actuator. The integral solenoid valve mount embodiments of this invention are adapted to both accommodate mechanical attachment with a solenoid valve in such a manner to minimize or prevent potential vibrational and physical damage thereto, and to facilitate connection between the solenoid valve and compressor housing boost air and vent ports in such manner as to avoid the need for external hoses. Generally speaking, each solenoid valve mount of this invention comprises an interface surface for each valve inlet port that is formed as part of a surface of the compressor housing itself, and that additionally supports mechanical attachment of the valve thereto without the need for ancillary brackets, hoses, and the like.

Figure 1:
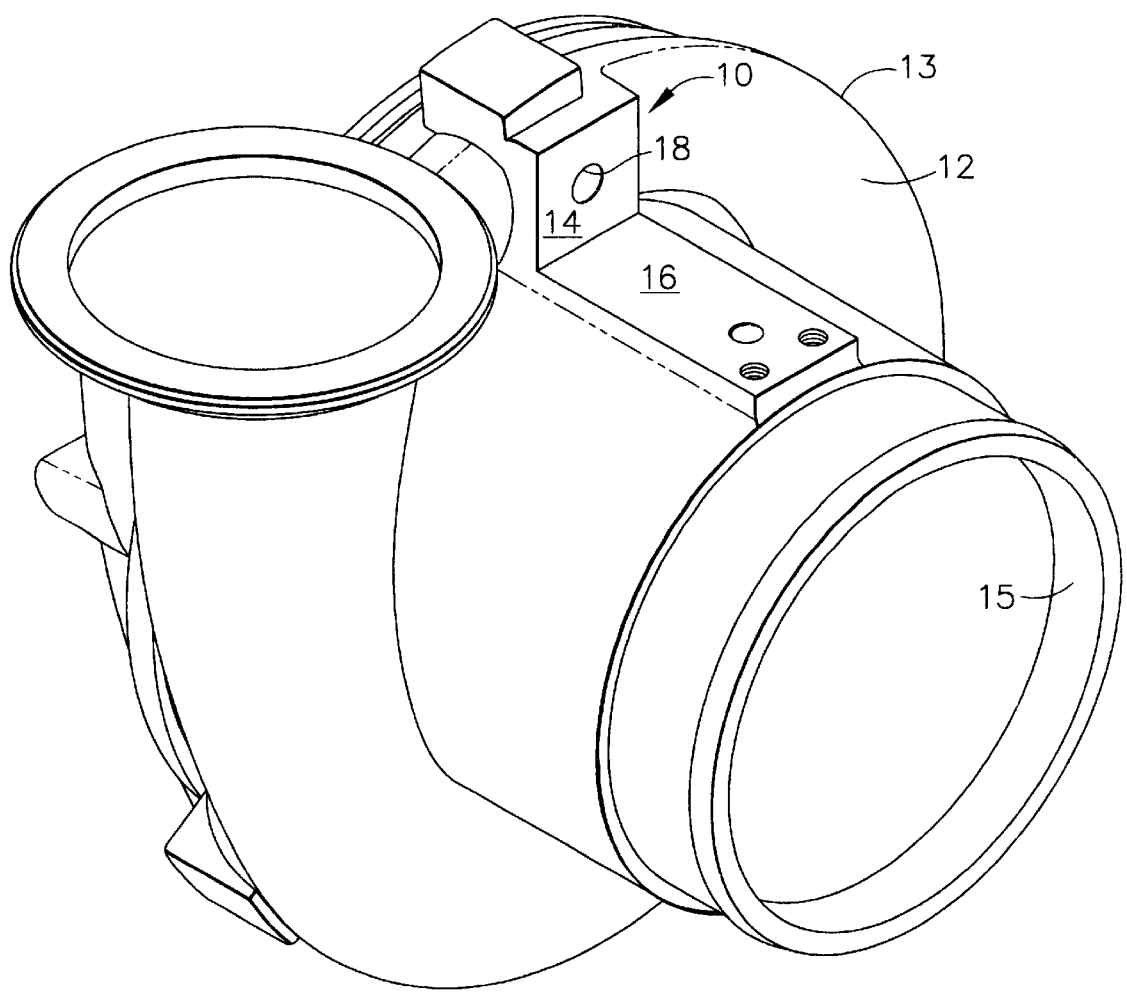
FIG. 1 is a perspective side view of a turbocharger compressor housing illustrating an "axial" integral solenoid valve mount constructed according to principles of this invention.

FIG. 1 illustrates a solenoid valve mount embodiment 10, constructed according to principles of this invention, that is integrally formed along an outside surface of a turbocharger compressor housing 12. The solenoid valve mount 10 is disposed along the compressor housing surface such that the axis of the solenoid valve (not shown), when attached, will be parallel to an axis passing though a housing air intake, and includes a vertical interfacing surface 14 and a horizontal interfacing surface 16 that is perpendicular to (i.e., 90 degrees from) the vertical interfacing surface.

Each interfacing surface is adapted to connect with a solenoid valve that is used to actuate or inhibit a turbocharger wastegate, as better described below. The valve mount 10 can be formed by either casting or by machining a portion of the compressor housing outside surface into the desired solenoid accommodating configuration. In a preferred embodiment, the valve mount 10 is provided by the casting method.

Figure 2:
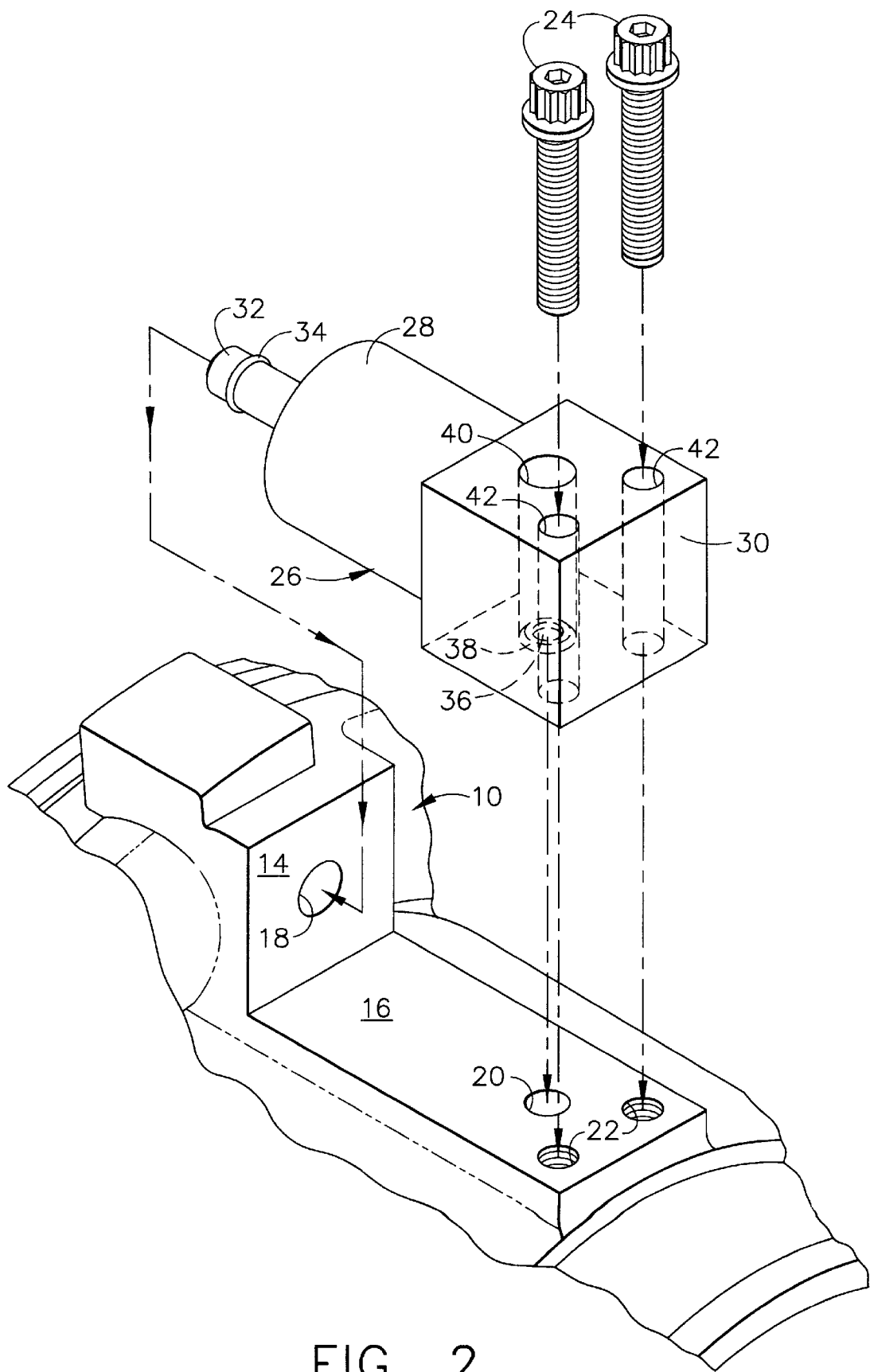
FIG. 2 is a perspective detailed exploded view of the integral solenoid valve mount of FIG. 1 having perpendicular 90 degree valve interface surfaces with solenoid valve.

FIG. 2 provides a detailed view of the axial valve mount 10 in FIG. 1, that includes vertical surface 14, which has been specifically designed to interface with stem 32 and O-ring 34 and surface 16, which has been specifically designed for a flat O-ring seal. Specifically, the valve mount vertical interface surface 14 includes a boost air port 18 that extends through the compressor housing 12 and into the compressor volute 13, in FIG. 1, where it communicates with pressurized boost air therein. The valve mount horizontal interface surface 16 includes a vent air port 20 that extends through the compressor housing into air intake 15, in FIG. 1, where it communicates with intake air near atmospheric pressure. The horizontal interface surface 16 also includes attachment holes 22 that are threaded to accept threaded engagement with solenoid valve mounting bolts 24.

A solenoid valve 26, for operating a wastegate actuator (not shown), is constructed having an actuating coil 28 and a valve body 30. In one embodiment, the solenoid valve 26 is designed to direct pressurized air from the wastegate actuator to the compressor inlet when the valve is actuated. A hollow stem 32 for receiving pressurized boost air extends outwardly away from the valve coil and includes a O-ring seal 34 disposed circumferentially therearound. The stem 32 is designed for placement within the valve mount boost air port 18, and the O-ring seal 34 is used for forming a leak-tight seal between the boost air port 18 and stem 32. A vent opening 36 for receiving vent air is disposed through a bottom surface of the valve body 30 and an O-ring 38 is disposed circumferentially therearound. The vent opening 36 is designed for placement adjacent the valve mount vent port 20, and the O-ring 38 is used for forming a leak tight face seal between the vent opening 36 and vent port 20. The valve body 30 includes a boost air outlet port 40 disposed along the valve body top surface that is configured internally within the valve body to route boost air from port 18 to port 40 when the solenoid valve is not actuated, and to route pressurized air from port 40, which is connected to the wastegate actuator, to port 20 when the solenoid valve is actuated.

The valve body 30 includes a pair of mounting bolt openings 42 that each pass from a valve body top surface to the bottom surface, and that receive valve mounting bolts 24 for attaching the valve to the valve mount. The valve 26 is mounted into place against the valve mount 10 by inserting the valve stem 32 into the boost air port 18, placing the valve vent opening 36 adjacent the valve mount vent port 20, and tightening the mounting bolts 24 to secure the valve into place. The valve outlet port 40 is connected to a wastegate actuator by conventional fitting and external tubing or the like, and the solenoid valve is connected to an appropriate control device capable of transmitting a control signal to effect valve actuation.

Figure 3:
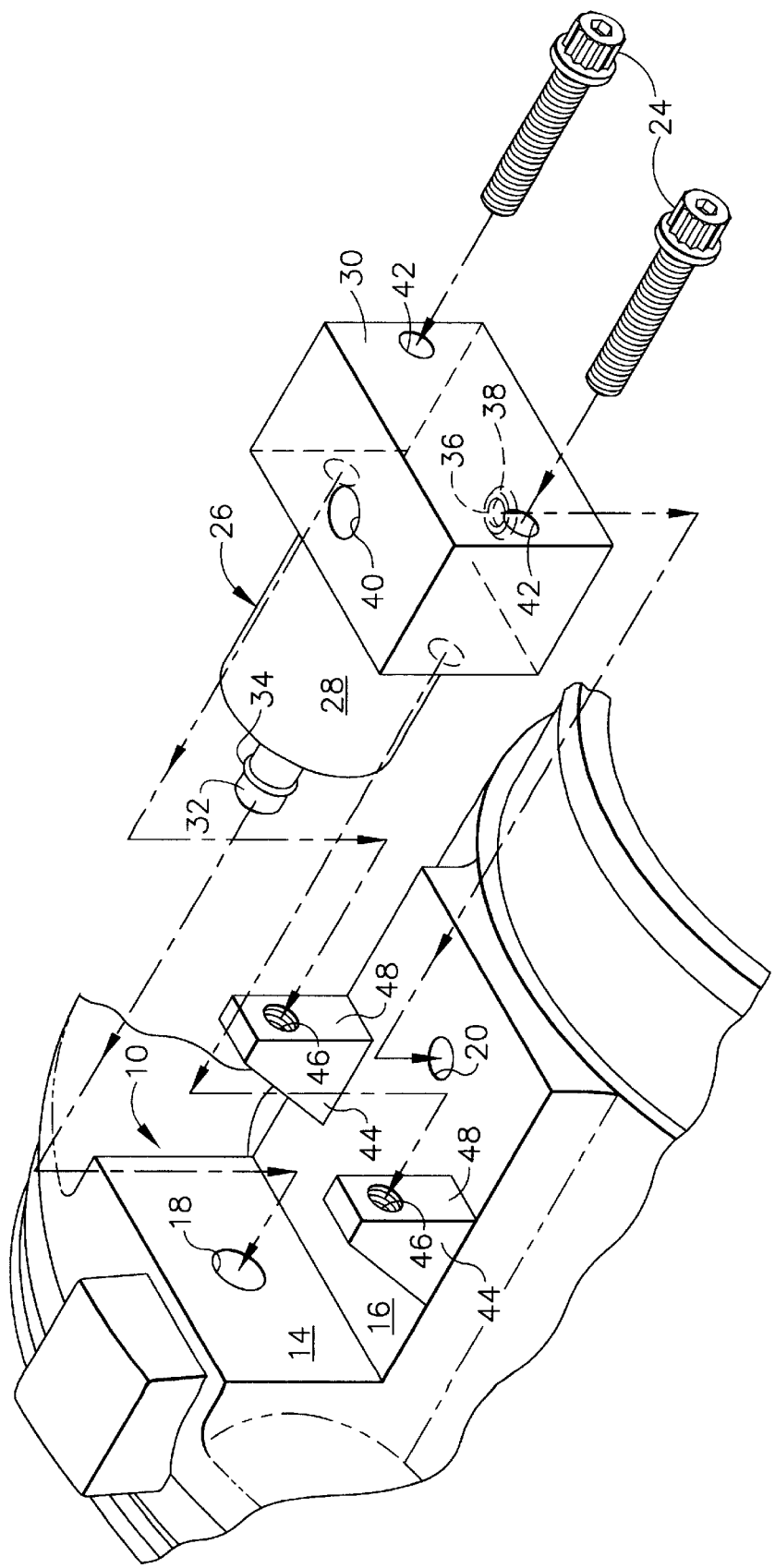
FIG. 3 is a perspective detailed exploded view of the integral solenoid valve mount of FIG. 1 having perpendicular valve interface surfaces with solenoid valve mounting parallel to axis of solenoid valve.

FIG. 3 illustrates a valve mount 10 that has valve mounting points that are different from that of FIG. 2. Specifically, valve mount 10 includes a pair of mounting pads 44 that each project upwardly away from the valve mount horizontal interface surface 16 and that each include attachment holes disposed within pad surfaces 48. The pad surfaces 48 are parallel to the vertical interface surface 14 (i.e., perpendicular to the horizontal interface surface 16) and the threaded holes 46 are perpendicular to the vertical interface surface 14. The solenoid valve 26 includes mounting bolt openings 42 that are disposed horizontally through the valve body, between valve body front and backside surfaces, for accommodating placement of mounting bolts 24 therethrough. The valve 26 is secured to the valve mount of FIG. 3 by tightening the mounting bolts into the pads 44, and makes connections with the mount boost air port 18 and vent port 20 in the same manner as was described for the mount embodiment of FIG. 2.

Figure 4:
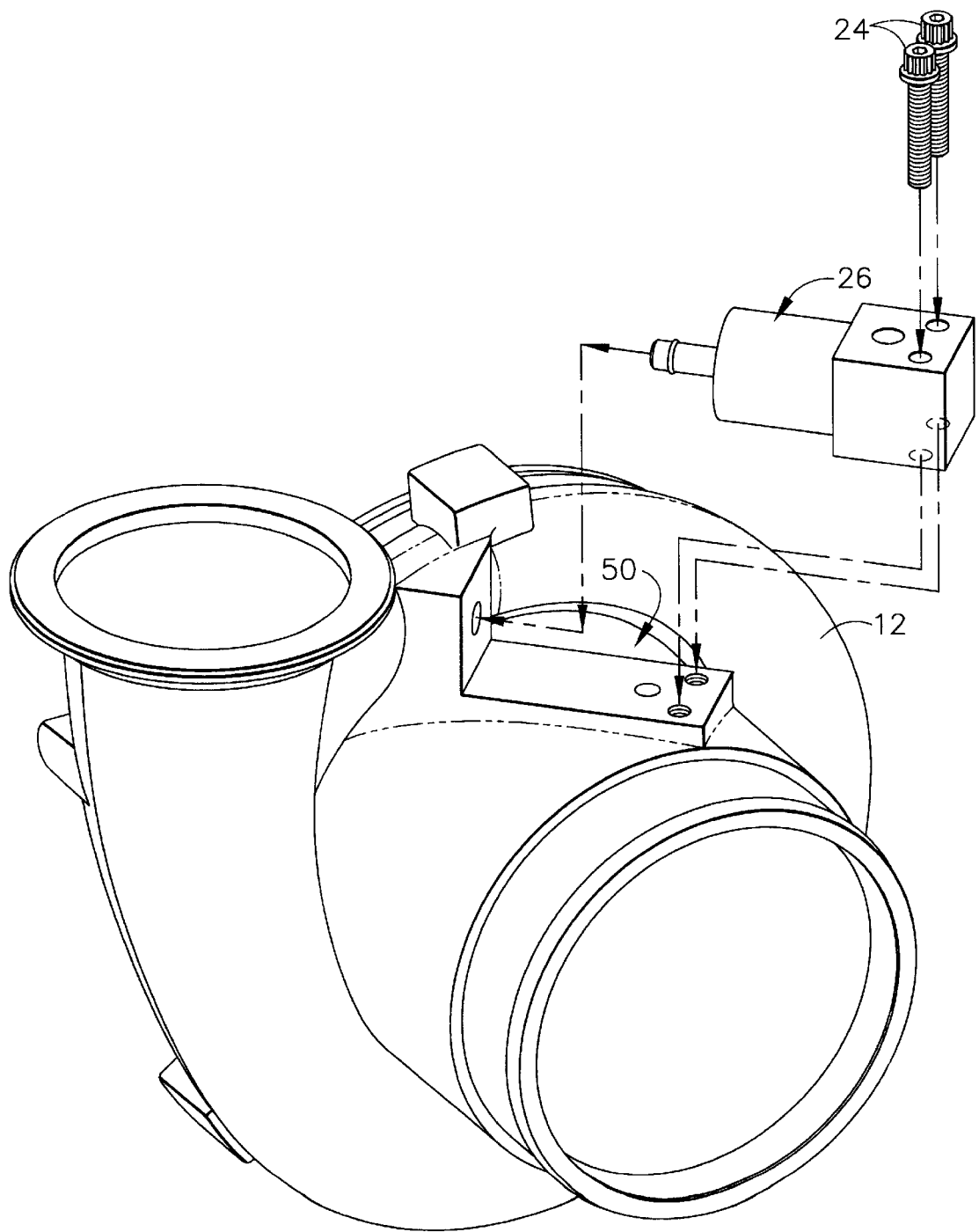
FIG. 4 is a perspective side view of a turbocharger compressor housing illustrating a "rotated axis" integral solenoid valve mount constructed according to principals of this invention.

FIG. 4 illustrates a solenoid valve mount 50 that is configured differently than that described above and illustrated in FIG. 1, in that it is fixed on the compressor housing 12 such that the axis of the solenoid valve 26, when mounted, is rotated from the axis of the compressor air inlet. Such an axially-rotated placement can be desirable to avoid interference with the compressor inlet air hose or to accommodate particular turbocharger applications calling for certain component locations, e.g., for applications having an engine compartment with reduced or minimal space. It is to be understood that the valve mount 50 can be used to accommodate attachment with a solenoid valve 26 using the attachment structures described above and illustrated in FIGS. 2 and 3.

Figure 5:
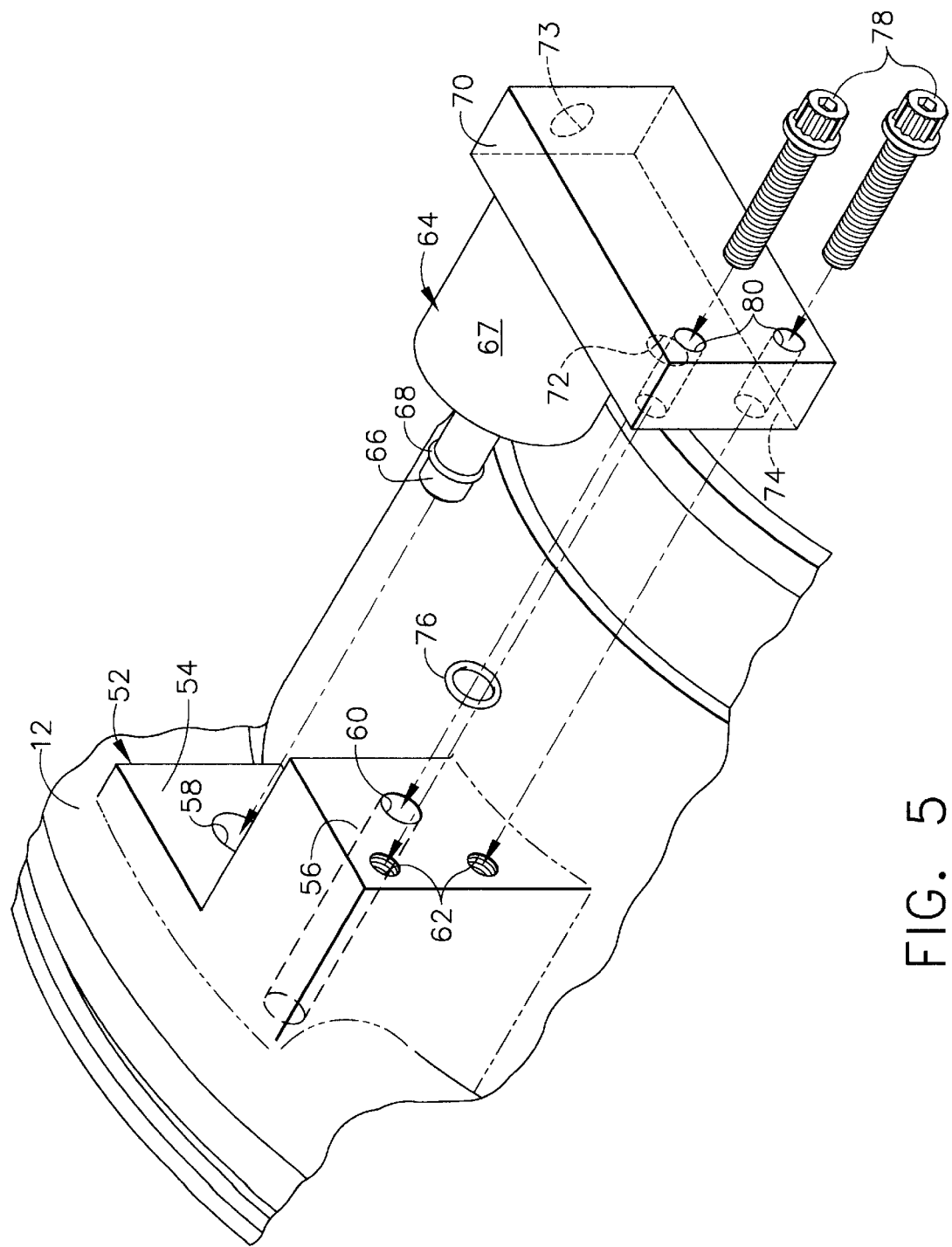
FIG. 5 is a perspective side view of a turbocharger compressor housing illustrating a "circumferential" rotated integral solenoid valve mount constructed according to principals of this invention.

FIG. 5 illustrates a further solenoid valve mount embodiment 52 that is integrally fixed on the compressor housing 12 such that the axis of the solenoid valve stem (not shown) is perpendicular to the mounting surface. The valve mount 52 is of a stepped configuration, comprising first and second solenoid valve interface surfaces 54 and 56 that are on different horizontal planes (as shown in FIG. 5). The valve mount 52 is made in the same manner as described above, as an integral part of the compressor housing.

The valve mount first interface surface 54 is disposed along an outside surface of the compressor housing opposite an internal compressor volute (not shown), and includes a boost air port 58. The boost air port 58 extends from the valve mount first interface surface 54 to the compressor volute and communicates with boost air therein. The second interface surface 56 is positioned a distance above the first interface surface and includes a vent air port 60 that extends through the valve mount and into the compressor housing air intake, where it communicates with intake air near atmospheric pressure. The interface surface 56 and the boost air port 58 are oriented such that the valve stem 66 enters port 58 in a direction perpendicular to surface 56. The interface surface 56 also includes a pair of mounting bolt openings 62.

A solenoid valve 64 for attaching to the valve mount 52 comprises a valve stem 66 that projects outwardly from a valve coil 67 and that has an O-ring seal 68 disposed circumferentially therearound. The valve stem 66 is adapted to fit within the valve mount boost air port 58 and facilitate the passage of boost air into the valve. The solenoid valve 64 also includes a valve body 70 that is attached to the valve coil 67 and that includes a vent opening 72 disposed through a bottom surface 74 at a location positioned to cooperate with the valve mount vent air port 60. A valve outlet port 73 extends from the valve body 70 and communicates internally with the valve stem 66 to facilitate passage of air through the valve, as described for FIG. 2, via suitable external connection means.

The solenoid valve 64 is attached to the valve mount 52 by placing the valve over the top of the valve mount so that the valve coil 67 is positioned over the first interface surface 54, and the valve stem 66 is placed within the boost air port 58, causing the O-ring seal 68 to form a leak-tight seal. The valve body 70 is placed over the valve mount second interface surface 56 so that the valve vent opening 72 is positioned over the vent air port 60, and a leak-tight is formed therebetween by use of an O-ring seal 76. The valve 64 is fixed into position through the use of mounting bolts 78 that extend through bolt openings 80 in the valve body and are threadably engaged with the mounting bolt openings 62 in the valve mount second interface surface.

Figure 6:
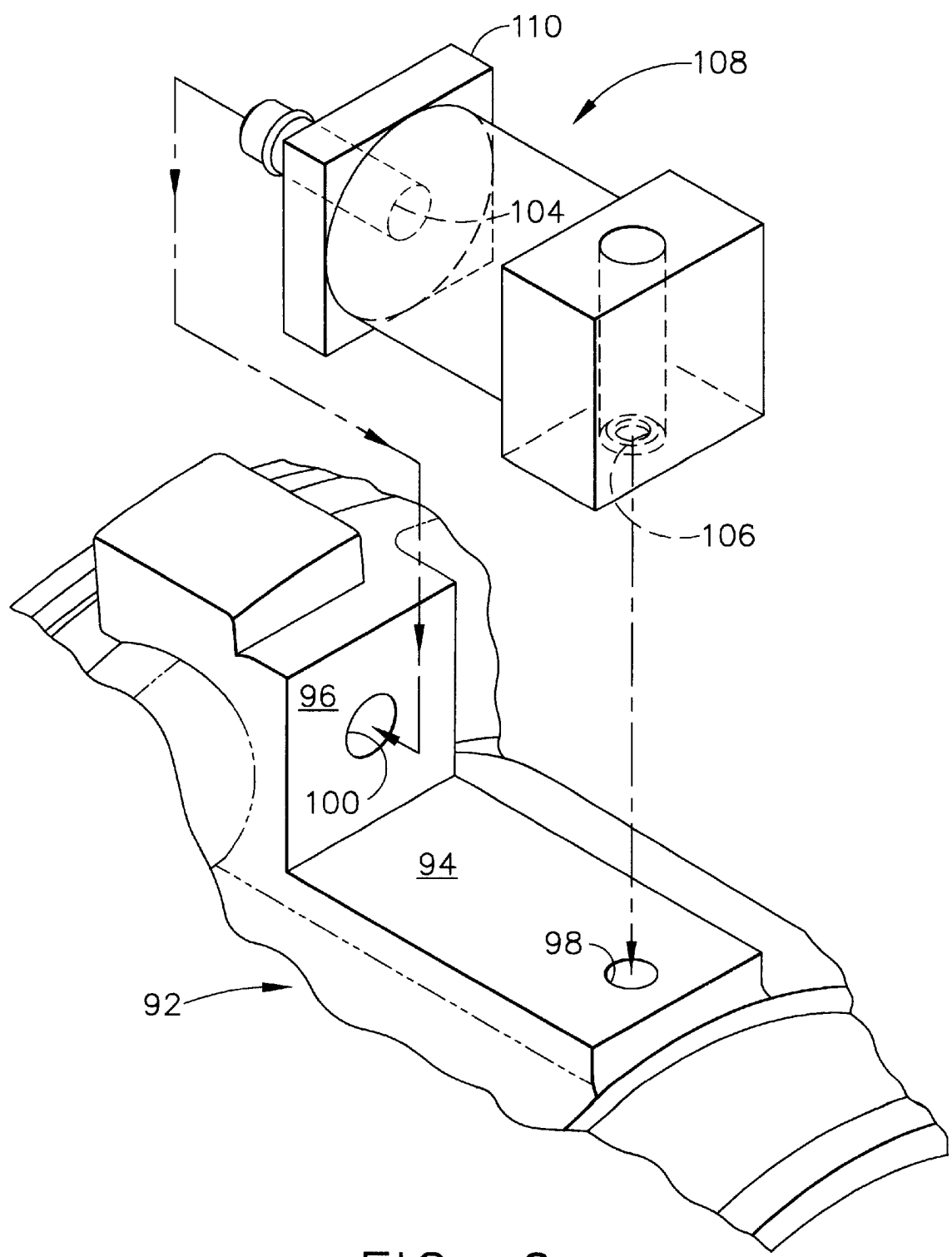
FIG. 6 is a perspective detailed exploded view of the integral solenoid valve mount of FIG. 1 having perpendicular valve interface surfaces and solenoid valve with dual flat seals.

FIGS. 2 and 6 illustrate two different ways in which solenoid valves can be attached to the valve mount 92 of FIG. 6. FIG. 2 shows the solenoid valve 26 comprising a hollow stem 32 for attachment to the valve mount vent air port 18, and a boost air opening 36 for attachment to the valve mount boost air port 20. O-ring seals can be used as described above to provide leak-tight seals at each port. Also, mounting bolts 24 can be used as described above to attach the solenoid valve to the valve mount 16. FIG. 6 shows a solenoid valve 108 comprising a seal block 110 that is disposed around a hollow stem 104 for providing a flat seal to be formed between the valve mount vent air port 100 and the hollow stem 104. As with the solenoid valve of FIG. 2, O-ring seals can be used as described above to provide leak-tight seals at each port and mounting bolts can be used to attach the solenoid valve to the valve mount 92.

Figure 7:
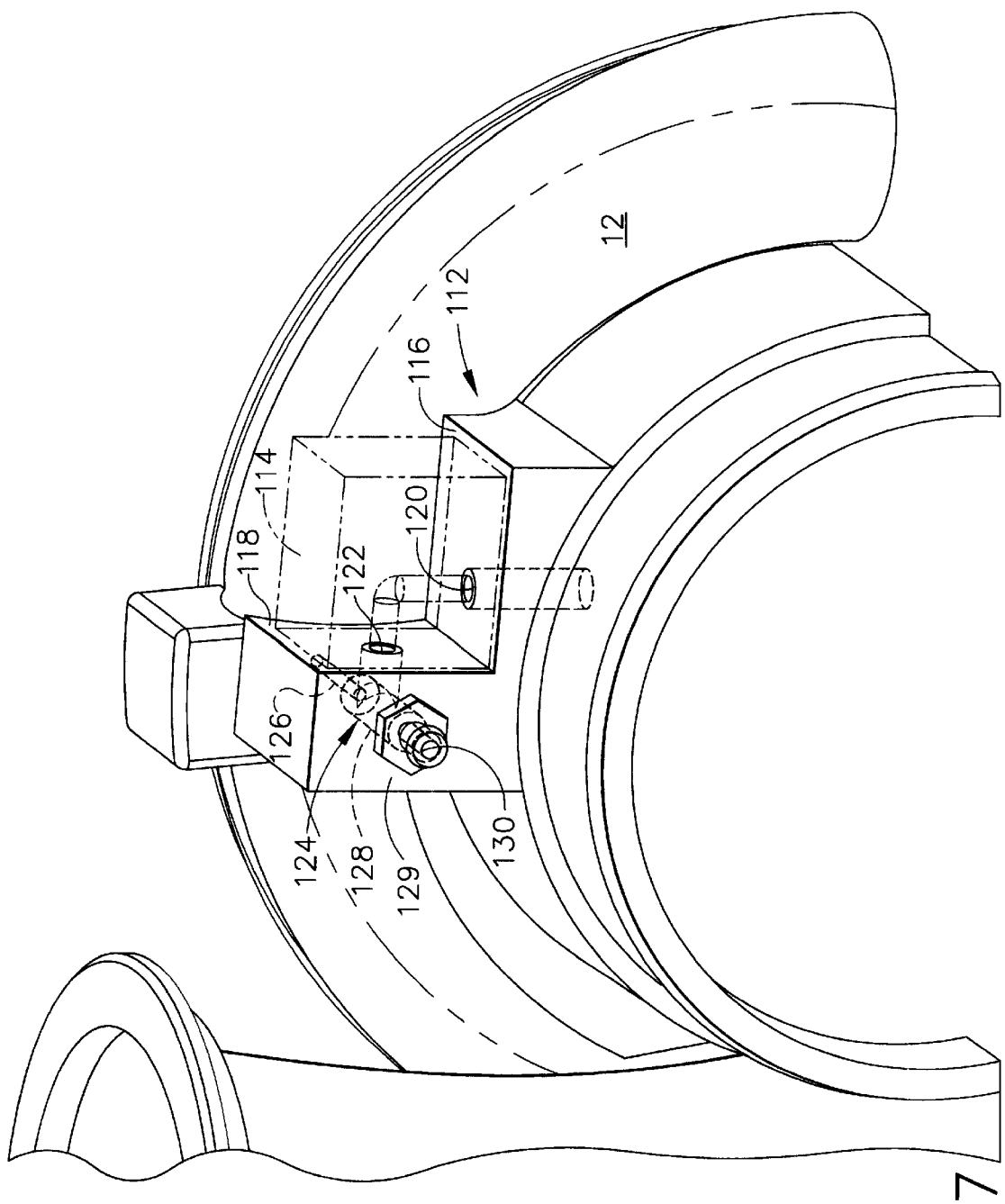
FIG. 7 is a perspective side view of a turbocharger compressor housing illustrating a "circumferential" integral solenoid valve mount constructed according to principles of this invention for use with a 2-way solenoid valve with perpendicular interface surfaces.

FIG. 7 illustrates a further valve mount embodiment 112 that is machined or cast as an integral part of the compressor housing 12, and that is positioned circumferentially therealong. The valve mount 112 is specially adapted for use with a 2-way solenoid valve 114 used to modulate or cut off pressure to a wastegate actuator. The valve mount 112 comprises a first interface surface 116 and a perpendicular second interface surface 118. The first interface surface 116 includes a vent air port 120 that extends therefrom, through the compressor housing, and to the compressor housing air intake. The second interface surface 118 includes a boost air port 122 that forms a third leg of a boost air tee 124 formed within the valve mount.

The boost air tee 124 includes a first leg 126 that extends within the valve mount from the compressor volute to the third leg. The boost air tee 124 includes a second leg 128 that extends within the valve mount from the third leg to a valve mount outside surface 129. The valve mount includes an outlet port that connects, by fittings 130 and a hose (not shown), to the wastegate actuator. The boost air tee first leg 126 is sized having a reduced diameter when compared to both the tee second and third legs to function as a flow-restriction orifice to reduce the flow rate of boost air from the compressor volute to the wastegate actuator via the outlet port 130. This enables pressurized air routed to a wastegate actuator to be vented via the solenoid valve, i.e., by passage through port 130 and tee second leg 128, into the tee first leg 122, through the solenoid valve 114, and into the vent air port 120.

Figure 8:
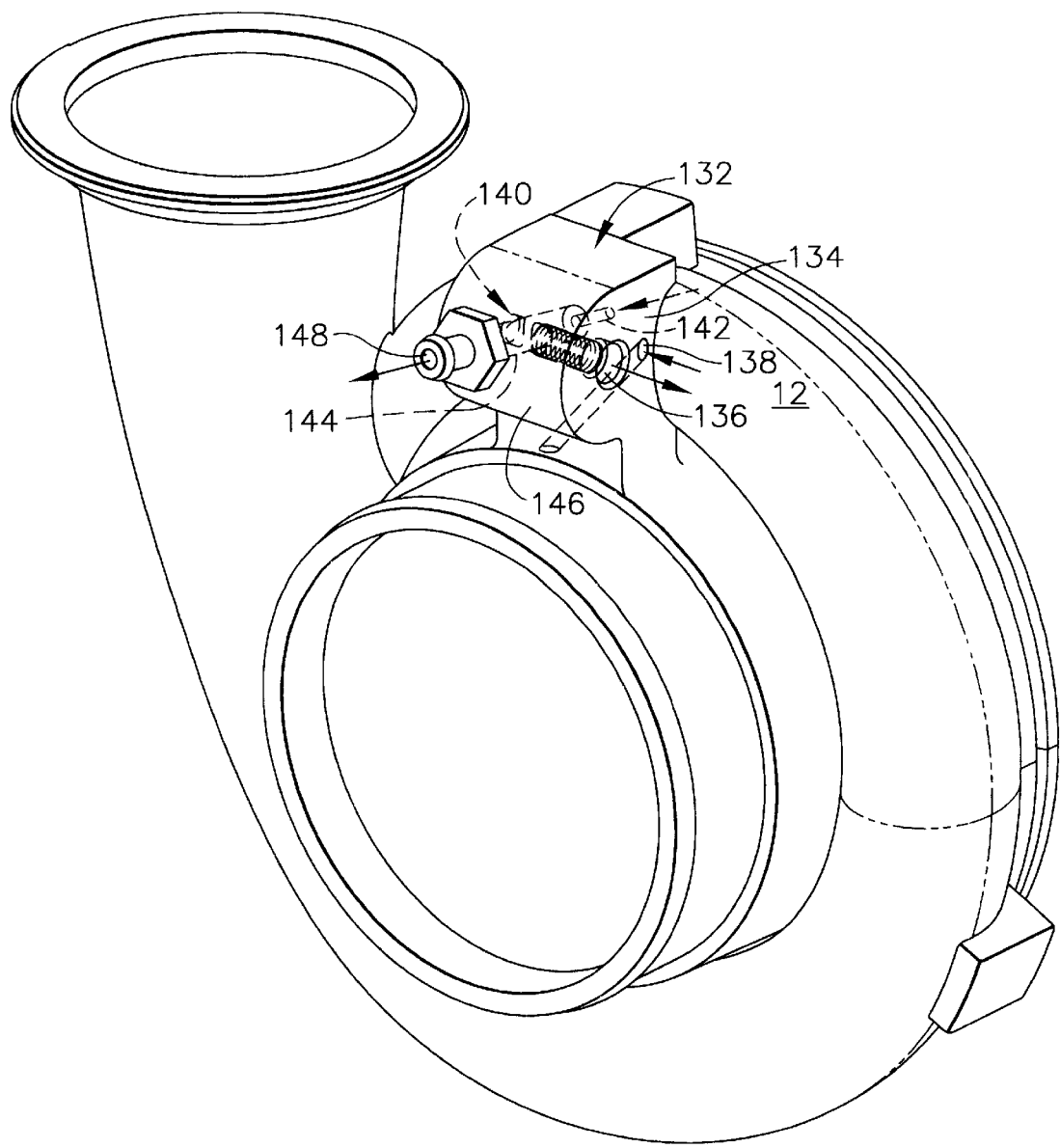
FIG. 8 is a perspective side view of a turbocharger compressor housing illustrating a "axially projecting" integral solenoid valve mount constructed according to principles of this invention.

FIG. 8 illustrates a still other solenoid valve mount embodiment 132 that is integral with and projects tangentially away from a turbocharger compressor housing 12 in the direction of the compressor inlet. Unlike the previously described and illustrated valve mount embodiments, this valve mount embodiment 132 comprises only a single interface surface 134 that is positioned along a circumferentially-directed surface of the valve mount. Like the valve mount embodiment of FIG. 7, the valve mount embodiment 132 of FIG. 8 is also adapted for use with a 2-way solenoid valve (shown in FIGS. 9 and 10) to modulate actuation of a wastegate.

The valve mount interface surface 134 includes both a boost air port 136 and a vent air port 138. The vent air port 138 extends through the valve mount and compressor housing to the compressor housing air intake. The boost air port 136 forms a third leg of a boost air tee 140 that is formed within the valve mount 132. The boost air tee 140 includes a first leg 142 that extends from the third leg 136 through the valve mount and compressor housing to the compressor volute, and a second leg 144 that extends from the third leg through the valve mount to a valve mount outside surface 146. Fitting 148 extends from the valve mount outside surface for connection with the wastegate actuator via a hose (not shown). Like the valve mount embodiment of FIG. 7, the boost air tee first leg 142 has a reduced diameter when compared to the tee second and third legs to function as a flow restriction orifice to restrict the flow rate of pressurized air passing from the compressor to the wastegate actuator via the valve mount outlet port. The boost air port 136 is internally threaded to accommodate a solenoid valve with a threaded valve body (shown in FIGS. 9 and 10), eliminating the need for additional threaded fasteners.

Figure 9:
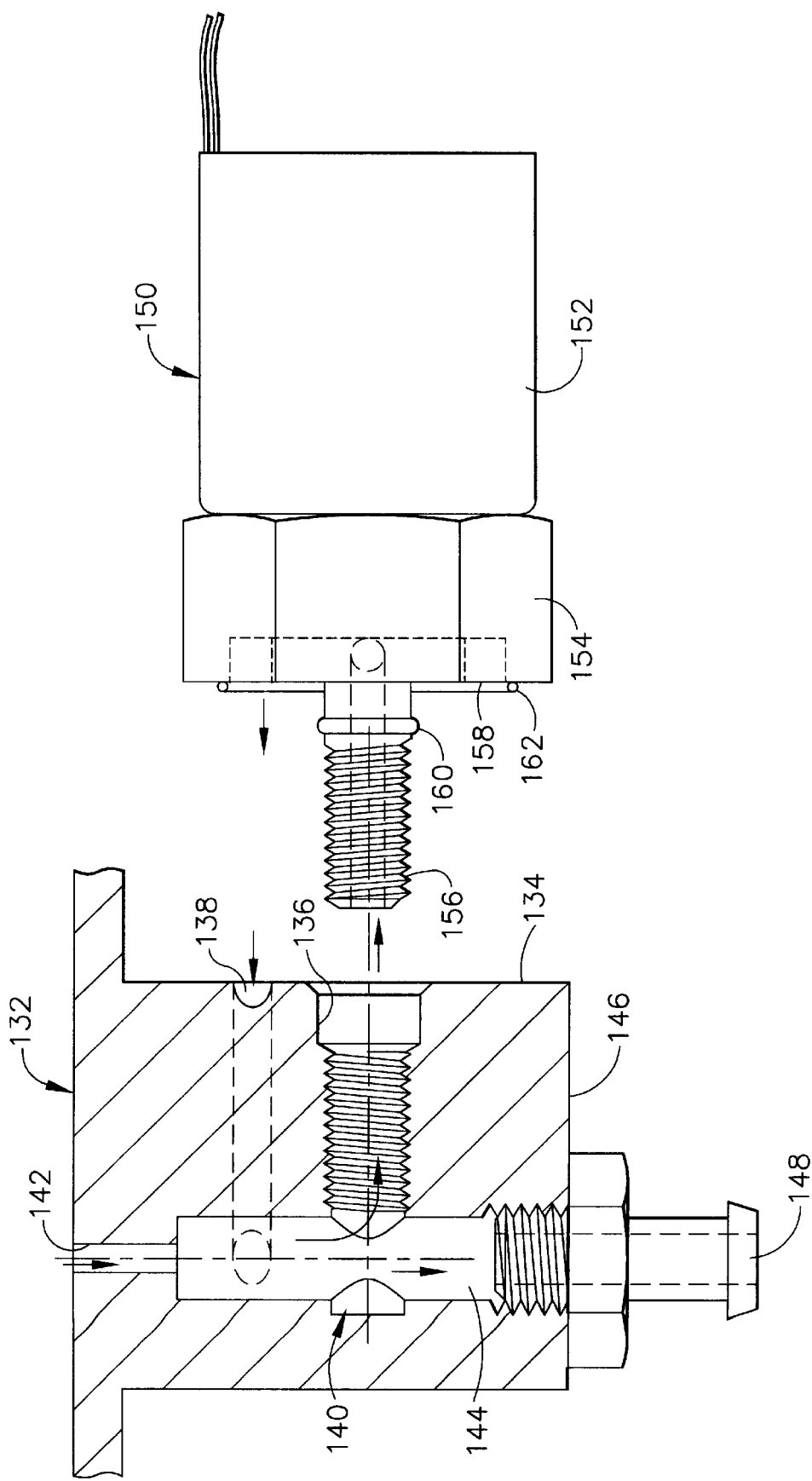
FIG. 9 is a perspective detailed exploded top view of the integral solenoid valve mount of FIG. 8 having a single surface with both valve interfaces and a solenoid valve with integral attachment.
Figure 10:
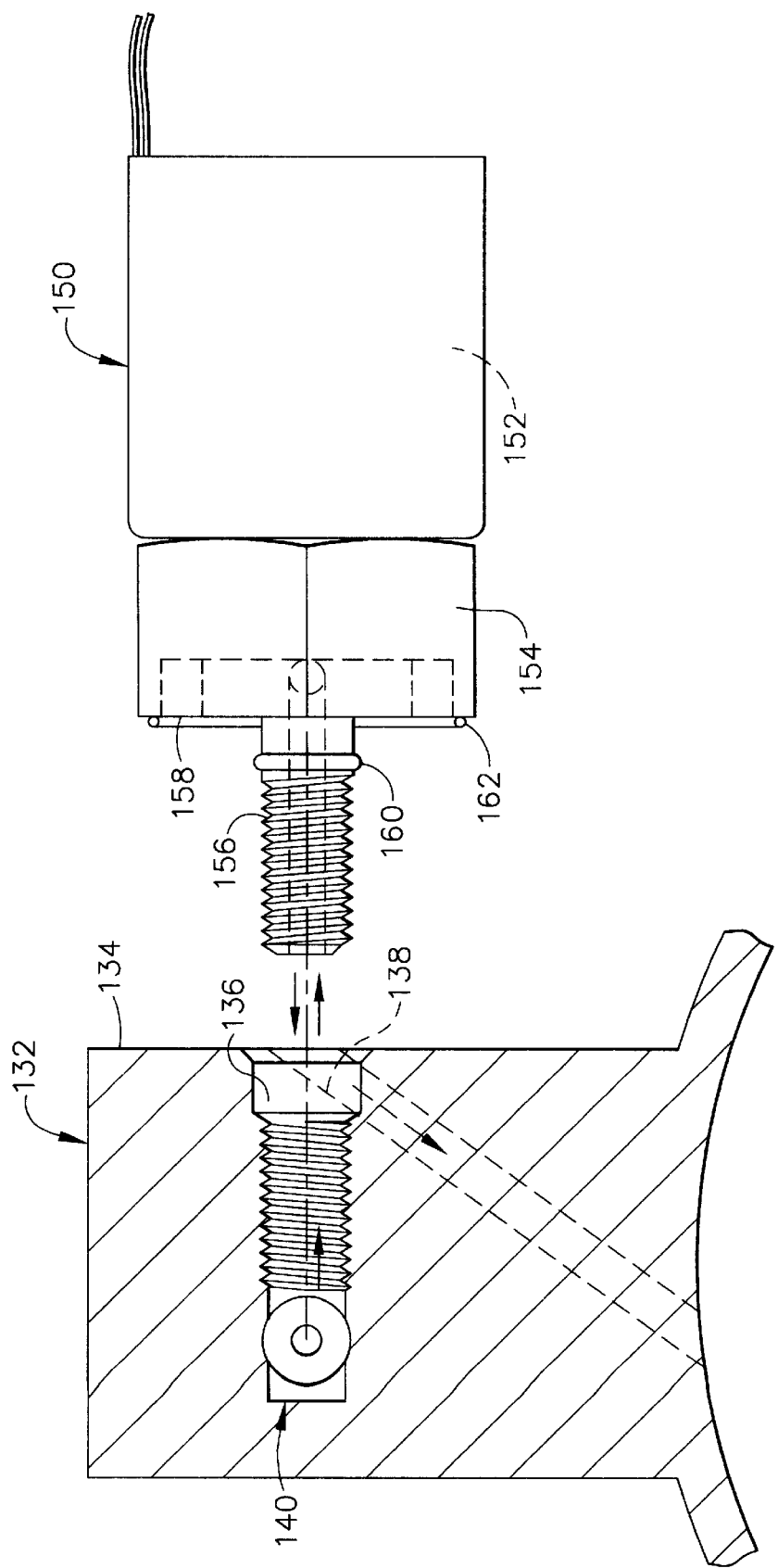
FIG. 10 is a perspective detailed exploded side view of the integral solenoid valve mount of FIG. 8 having a single surface with both valve interfaces and a solenoid valve with integral attachment.

FIGS. 9 and 10 are detailed views of the valve mount embodiment 132 of FIG. 8 showing attachment of a solenoid valve 150 therewith. FIG. 9 is a top cross section of the valve mount 132 showing the configuration of the boost air tee 140 formed integrally therein. FIG. 10 is a side cross section of the valve mount showing the vent air port 138 and its passage through the valve mount and compressor housing to the compressor air intake. The solenoid valve 150 includes a coil 152 and a valve body 154 attached thereto. A threaded hollow stem 156 projects outwardly a distance from the valve body 154 and is threaded for attachment with the valve mount boost air port 136. The solenoid valve also includes a vent air opening disposed within a valve body surface 158 and positioned concentrically around the stem 156. A first O-ring seal 160 is disposed circumferentially around a portion of the stem, and a second O-ring seal 162 is positioned along the valve body surface 158 concentrically around the stem and radially outside of the vent air port 138. The solenoid valve is attached to the valve mount 132 by threadably engaging the valve stem 156 within the boost air port 136 until leak-tight seals are formed both between the stem 156 and boost air port 136, and between the valve body and valve mount surfaces 158 and 134.

Figure 11:
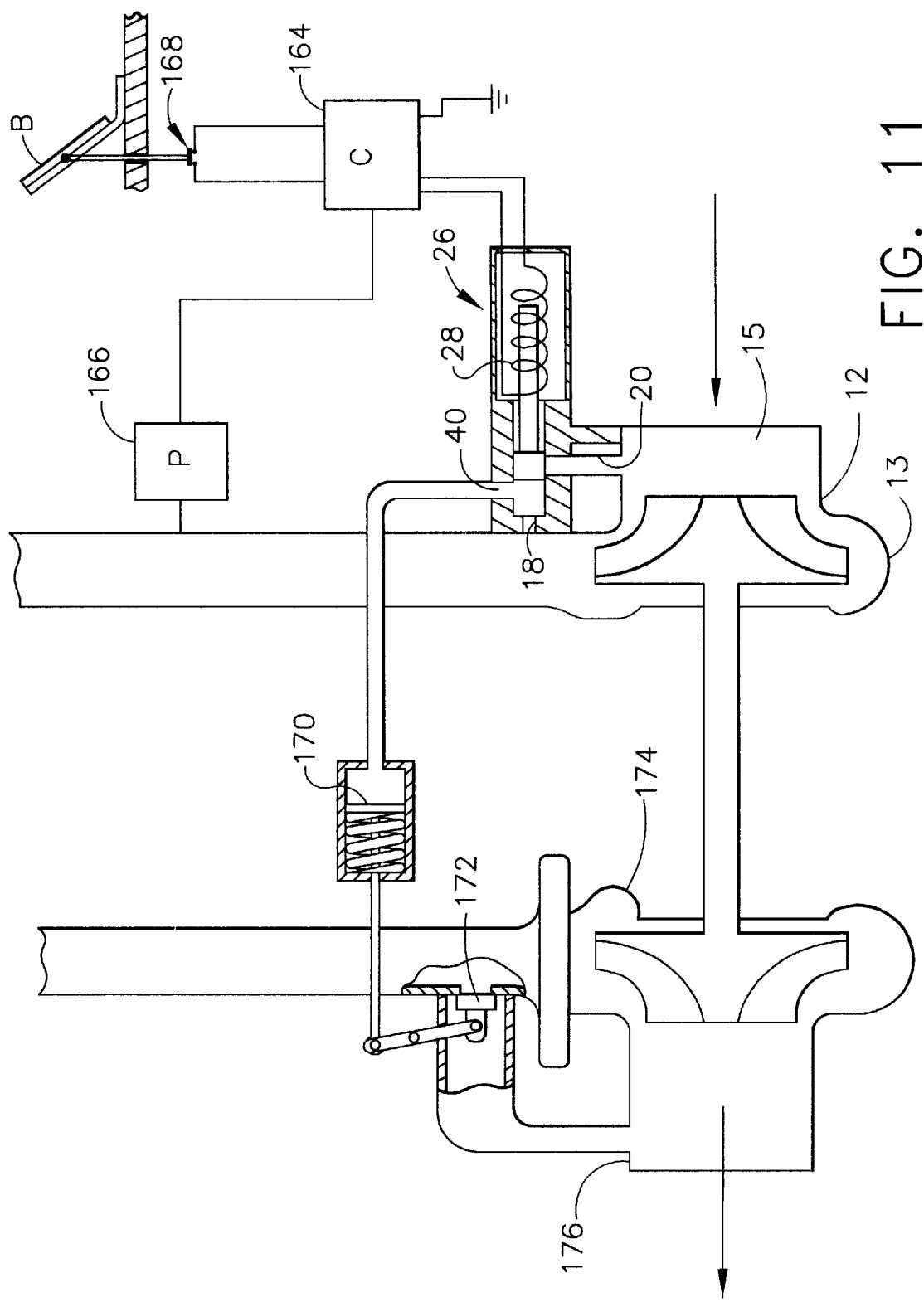
FIG. 11 is a schematic diagram of the control system for the present invention.

FIG. 11 shows in schematic form a wastegate control system embodying the present invention as shown in FIGS. 1 and 2 for both wastegate actuation and override. A controller 164 receives input signals from a pressure sensor 166 and a brake pedal microswitch 168. Solenoid valve 26 is activated by the controller from a first position in which pressure from port 18 is connected to the wastegate actuator 170 through port 40 to allow opening of wastegate 172 and a second position in which pressure from port 18 is dumped to outlet port 20 resulting in deactivation of the wastegate actuator and closure of the wastegate. Opening of the wastegate allows excess exhaust pressure in turbine volute 174 to be vented around the turbine directly to the turbine housing exhaust 176. In a dual control embodiment, the solenoid activates to the second position and remains there until a predetermined pressure is sensed by the pressure sensor or an event, such as engine braking, is concluded and the controller deactivates the solenoid to block outlet port 20, allowing pressurization of the actuator and opening of the wastegate. When the brake pedal of the truck is actuated closing the microswitch, the controller activates the solenoid thereby opening outlet port 20 to dump pressure from the wastegate actuator and closing the wastegate to maximize boost for engine braking of the truck. Those skilled in the art will recognize that the alternative embodiments are designed such that the normal state of the solenoid valve is the first position described above, which results in a fully functional wastegate and maximum fail safe protection for various truck operation and failure modes.

A key feature of valve mount embodiments constructed according to principles of this invention is their construction as an integral component of the compressor housing, thereby avoiding the use of separate brackets, connectors, external tubing, and the like. The use of such integral mounting structure minimizes or eliminates altogether potential damage that can be caused to the solenoid valve and connecting hoses by vibration or by physical contact with adjacent objects. The integral construction of valve mounts of this invention also minimizes or eliminates potential damage caused to the solenoid valve or connecting hoses by exposure to high temperatures, which is avoided by placing the solenoid valve close to the compressor housing air intake. A further advantage of valve mounts of this invention is that they reduce the number of connection members and ancillary devices that are typically used with a two-way solenoid valve to achieve modulated wastegate actuator activation, e.g., avoiding the need to use a separate tee and restriction orifice. Also, a valve mount designed to accommodate a solenoid valve with a threaded valve body eliminates the need for additional fasteners to mount the valve.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger for internal combustion engines comprising:
   a turbine housing having a turbine rotatably disposed therein;
   a compressor housing having a compressor rotatably disposed therein, the compressor housing including an air intake for receiving air therein and a volute for receiving air pressurized by the compressor;
   a valve mount integral with the compressor housing and disposed along a compressor housing outside surface, the valve mount including a first air port disposed therein in communication with the compressor volute, and a second air port disposed therein in communication with the compressor air intake;
   means for attaching the valve mount to a solenoid valve; and
   means for forming a leak-tight seal between the solenoid valve and the valve mount first and second air ports.

2. The turbocharger as recited in claim 1 wherein the valve mount includes a first interface surface and a second interface surface each adapted to connect with a solenoid valve, and wherein the first air port is disposed in the first interface surface and the second air port is disposed in the second interface surface.

3. A turbocharger for internal combustion engines comprising:
   a turbine housing having a turbine rotatably disposed therein;
   a compressor housing having a compressor rotatably disposed therein, the compressor housing including an air intake for receiving air therein and a volute for receiving air pressurized by the compressor;

a boss integral with the compressor housing and extending substantially perpendicularly from an outer surface thereof, the boss having a first bore extending substantially parallel to an axis of rotation of the turbine and compressor, said first bore communicating at a first end with the volute and terminating at a second end in an attachment fitting, the boss further having a second bore extending substantially perpendicular to the first bore and substantially tangential to the outer surface and intersecting the first bore, the second bore terminating at an aperture in a planar mounting face on the boss, the boss additionally including a third bore extending from said planar mounting face to said air intake in the compressor housing;

a solenoid actuated valve mounted on said planar mounting face and having a poppet adapted to seal the second bore aperture in a first position and connect the aperture to a flow path in a second position, the flow path communicating with the third bore; and a control means for energizing the solenoid.

4. The turbocharger as defined in claim 3 wherein the control means includes a means for sensing actuation of a brake pedal.

5. The turbocharger as defined in claim 3 wherein the control means includes a means for sensing pressure proximate the volute.

6. The turbocharger as defined in claim 3 wherein the turbine housing includes a wastegate and further comprising:

a pneumatic actuation means operably connected to the attachment fitting for actuation of the wastegate by pressure provided through the first bore from the volute with the poppet in the first position.

* * * * *

(12) EX PARTE REEXAMINATION CERTIFICATE (5980th)
United States Patent
Knaack et al.

(10) Number: US 6,205,784 C1
(45) Certificate Issued: Oct. 30, 2007

(54) INTEGRALLY MOUNTED PNEUMATIC SOLENOID VALVE FOR WASTEGATE CONTROL

(75) Inventors: Russell A. Knaack, Torrance, CA (US); Billy D. Watkins, Rancho Palos Verdes, CA (US); Dennis Thoren, Huntington Beach, CA (US); Peter Haug, Torrance, CA (US)

(73) Assignee: Honeywell International Inc., Morristown, NJ (US)

Reexamination Request:
No. 90/007,677, Aug. 19, 2005

Reexamination Certificate for:
Patent No.: 6,205,784
Issued: Mar. 27, 2001
Appl. No.: 09/361,644
Filed: Jul. 27, 1999

(51) Int. Cl.
*F02D 23/00* (2006.01)

(52) U.S. Cl. .................................. 60/602; 60/605.2
(58) Field of Classification Search .................. None
See application file for complete search history.

(56) References Cited

U.S. PATENT DOCUMENTS 5,487,273 A  1/1996  Elpern et al.

FOREIGN PATENT DOCUMENTS

JP   63205419   8/1988

OTHER PUBLICATIONS

PCT International Preliminary Examination Report, dated Feb. 11, 2001, for PCT/US00/19886, filed Jul. 20, 2000 (based on the application resulting in the 6,205,784 patent).

*Primary Examiner*—Bibhu Mohanty

(57) ABSTRACT

A turbocharger for internal combustion engines having a valve mount cast or machined integral with the compressor housing and disposed along a compressor housing outside surface, the valve including a first air port in communication, through a restriction orifice, with the compressor volute and at least one of a second air port in communication with the first port, and a third port in communication with the compressor air intake. The mount includes attachments for a solenoid valve to the valve mount and a means for forming a leak-tight seal between the solenoid valve and the second and third air ports. A control system for actuating the solenoid allows venting of pressure from the second air port to the third air port for application in controlling a wastegate actuator or disengaging the wategate actuator by venting pressure from the first port to the second port.

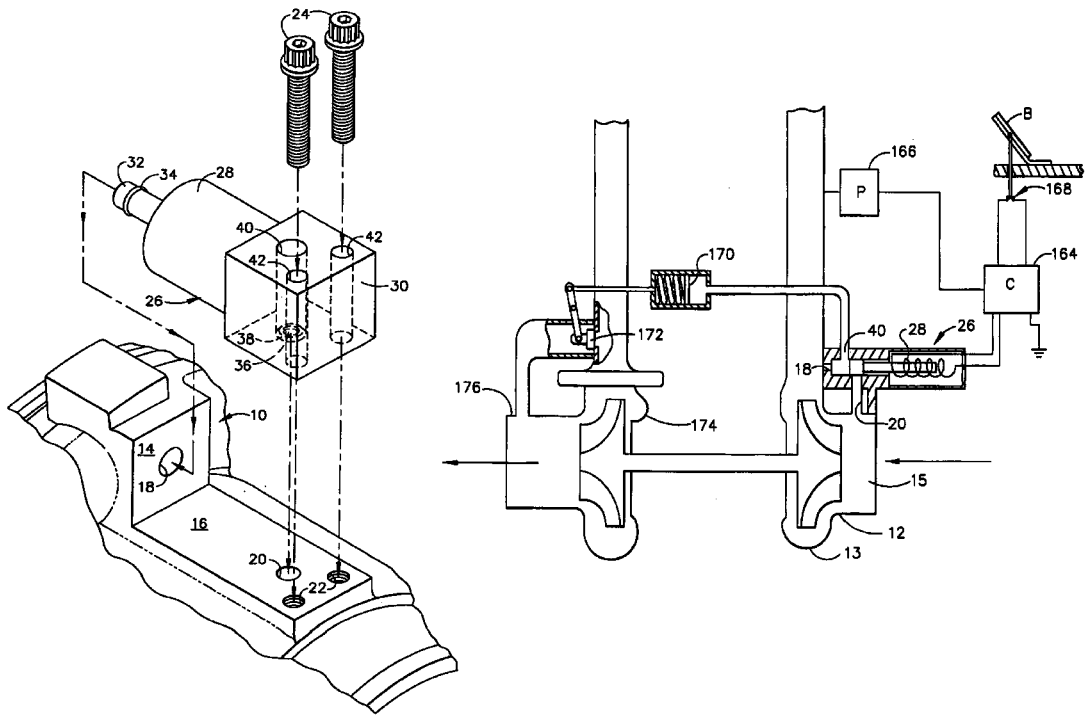

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3–6 is confirmed.

Claim 1 is determined to be patentable as amended.

Claim 2, dependent on an amended claim, is determined to be patentable.

New claims 7–16 are added and determined to be patentable.

1. A turbocharger for *an* internal combustion [engines] *engine* comprising:
   a turbine housing having a turbine rotatably disposed therein, *the turbine being configured to be driven by exhaust gas from the internal combustion engine*;
   a compressor housing having a compressor rotatably disposed therein, the compressor housing including an air intake for receiving air therein and a volute for receiving air pressurized by the compressor;
   a valve mount integral with the compressor housing and disposed along a compressor housing outside surface, the valve mount including a first air port disposed therein in communication with the compressor volute, and a second air port disposed therein in communication with the compressor air intake;
   *a wastegate in fluid communication with the turbine housing, said wastegate being configured to actuate between a closed position and an open position based on a pressure level of air from the first air port, the wastegate in the open position providing for a portion of the exhaust gas to be diverted so as not to drive the rotation of the turbine;*
   means for attaching the valve mount to a solenoid valve; and
   means for forming a leak-tight seal between the solenoid valve and the valve mount first and second air ports.

7. *The turbocharger as recited in claim 1, and further comprising a solenoid configured to vent the air from the first air port, and thereby limit actuation of the wastegate.*

8. *The turbocharger as recited in claim 7, wherein the solenoid is configured to limit the actuation of the wastegate when the solenoid is actuated.*

9. *The turbocharger as recited in claim 7, wherein the solenoid includes a hollow stem configured for placement within the first air port to receive the pressurized air from the first air port.*

10. *The turbocharger as recited in claim 9, wherein the solenoid further includes an O-ring disposed circumferentially around the hollow stem and configured to form a seal between the stem and first air port.*

11. *The turbocharger as recited in claim 7, wherein the solenoid and compressor housing are cooperatively threaded to provide for the connection of the solenoid to the compressor housing.*

12. *The turbocharger as recited in claim 7, and further comprising a controller configured to actuate the solenoid based on a signal from a boost pressure sensor.*

13. *The turbocharger as recited in claim 7, and further comprising a controller configured to actuate the solenoid based on a signal from a brake pedal sensor.*

14. *The turbocharger as recited in claim 1, and further comprising a solenoid configured to vent the air from the first air port, and thereby limit actuation of the wastegate, wherein:*
   *the solenoid is configured to limit the actuation of the wastegate when the solenoid is actuated;*
   *the solenoid includes a hollow stem configured for placement within the first air port to receive the pressurized air from the first air port; and*
   *the solenoid further includes an O-ring disposed circumferentially around the hollow stem and configured to form a seal between the stem and first air port.*

15. *A turbocharger for internal combustion engines comprising:*
   *a turbine housing having a turbine rotatably disposed therein;*
   *a compressor housing having a compressor rotatably disposed therein, the compressor housing including an air intake for receiving air therein and a volute for receiving air pressurized by the compressor;*
   *a valve mount integral with the compressor housing and disposed along a compressor housing outside surface, the valve mount having first and second interface surfaces, wherein the first interface surface includes a first air port that extends through the compressor housing and into the compressor volute, and wherein the second interface surface includes a second air port that extends through the compressor housing into the compressor air intake;*
   *a solenoid having a hollow stem extending through the first air port to receive pressurized air through the first air port;*
   *means for attaching the valve mount to a solenoid valve; and*
   *means for forming a leak-tight seal between the solenoid valve and the valve mount first and second air ports.*

16. *The turbocharger as recited in claim 15, wherein the solenoid further includes an O-ring disposed circumferentially around the hollow stem and configured to form a seal between the stem and first air port.*

* * * * *